United States Patent Office 3,574,730
Patented Apr. 13, 1971

3,574,730
PRODUCTION OF ACETIC ACID
Clifford William Capp, Ewell, and Brian Walton Harris, Horley, England, assignors to BP Chemicals (U.K.) Limited, London, England
No Drawing. Filed Nov. 28, 1967, Ser. No. 686,283
Claims priority, application Great Britain, Dec. 20, 1966, 56,912/66
Int. Cl. C07c 53/08
U.S. Cl. 260—533    10 Claims

ABSTRACT OF THE DISCLOSURE

In a process for the production of acetic acid from ethylene, wastage of ethylene due to combusion to carbon oxides is obviated by use of a palladium metal/transition metal oxide or salt catalyst.

---

The present invention relates to a process for the production of acetic acid and in particular to a process for the production of acetic acid by the conversion of ethylene.

Processes are known for the conversion of ethylene to acetic acid by the vapor phase reaction with molecular oxygen in the presence of steam over a catalyst comprising a noble metal oxide or salt and generally in addition a cobalt, manganese and/or vanadium oxide suported on alumina. Such processes are however not economical owing to the fact that there is a high loss of the ethylene starting material due to burning to carbon dioxide.

It is an object of the present invention to substantially overcome such disadvantages of the known processes.

Accordingly, the present invention is a process for the production of acetic acid which comprises reacting in the vapor phase at an elevated temperature ethylene, a molecular oxygen-containing gas and steam over a supported catalyst comprising palladium metal together with a transition metal oxide or salt. The transition metal may be for example iron, nickel, molybdenum, cerium, copper, chromium, manganese or cobalt. Mixtures of the oxides or salts of the same or different metals may also be used. It is preferred to use the salt of the metal, e.g., the acetate. The preferred transition metal is chromium. The catalyst support may be any of known catalyst supports, e.g., alumina, silica, kieselguhr, pumice, etc. The preferred support is alumina which has been heated at a temperature in the range 600° to 1500° C., preferably about 1000° C., in a molecular oxygen containing gas for a period of 2 to 24 hours.

The molecular oxygen containing gas may be elemental oxygen as such as air or as mixtures of oxygen with air.

The catalyst may be prepared in any suitable manner: thus the support may be impregnated with an aqueous solution of palladium metal salt, e.g., palladous chloride, the latter then being reduced to palladium metal by treatment with hydrogen or hydrazine conveniently in the form of hydrazine hydrate dissolved in an alkaline solution, e.g., sodium hydroxide. The impregnated support is then isolated, e.g., by filtration, washes with water and finally dried. The transition metal oxides or salts may then be incorporated with the palladium support.

The process may be carried out at subatmospheric, atmospheric or superatmospheric pressure. Preferably, the process is effected under pressures which are suitably in the range 1 to 80 atmospheres. Suitable reaction temperatures are 50 to 350° C., temperatures in the range 150 to 250° C., being preferred.

The acetic acid product may be recovered from the reaction gases by condensation by cooling the gases or by scrubbing the gases with a suitable solvent, from which the acetic acid is separated by distillation.

The process of the present invention is illustrated further with reference to the following examples.

EXAMPLE 1

A catalyst containing 5% palladium and 1.5% by weight of chromium was prepared as follows:

Granules (6–15 mesh) of alumina which had been heat treated at 1060° C. for 24 hours were impregnated with a solution of palladium chloride in 50% hydrochloric acid. The palladium chloride/alumina was dried at 110° C. and treated with hydrazine hydrate in 2 N caustic soda solution until no further gas evolution occurred. The palladium/alumina was washed to free from chloride ions, dried at 110° and impregnated with chromium acetate. After final drying at 110° the catalyst was packed in a glass reactor which was heated in an oil bath. A mixture of ethylene 1%, air 32% and steam 67% by volume was passed over the catalyst at 180°, 10 seconds contact time. The selectivities were: acetic acid 51%, acetaldehyde 37%, vinyl acetate 1%, ethylene glycol monoacetate 1%, and carbon dioxide 7%. After running for several days the selectivities were: acetic acid 60%, acetaldehyde 28%, vinyl acetate 2% and carbon dioxide 10%.

EXAMPLE 2

A catalyst containing palladium 5% by weight and chromium acetate 5% by weight on 1060° heat-treated alumina was prepared as in Example 1. A mixture of ethylene 1%, air 32%, and steam 67% by volume was passed over the catalyst at 180°, 8.4 seconds contact time. The selectivities were acetic acid 60%, acetaldehyde 28, vinyl acetate 1.6 and carbon dioxide 10%. At 190° using a feed of ethylene 4.9%, air 25%, steam 70% at 8.3 seconds contact time the selectivities were acetic acid 44, acetaldehyde 33%, vinyl acetate 1%, acetates of ethylene glycol 15.2% and carbon dioxide 6%.

We claim:

1. A process for the production of acetic acid which comprises reacting in the vapor phase at a temperature of 50 to 350° C. and a pressure of 1 to 80 atmospheres ethylene, a molecular oxygen-containing gas and steam over a supported catalyst consisting essentially of metallic palladium together with a material selected from the group consisting of a transition metal oxide and a transition metal salt.

2. A process as claimed in claim 1 wherein the transition metal is selected from the group consisting of iron, nickel, molybdenum, cerium, copper, chromium, manganese and cobalt.

3. A process as claimed in claim 2 wherein mixtures of the oxides or salts of the same or different transition metals are used.

4. A process as claimed in claim 1 wherein the transition metal salt is the acetate.

5. A process as claimed in claim 1 wherein the catalyst is supported on alumina which has been previously heated at a temperature in the range 600° to 1500° in a molecular oxygen containing gas for a period of 2 to 24 hours.

6. A process as claimed in claim 1 carried out at temperatures in the range 150 to 250° C.

7. A process for the production of acetic acid which comprises reacting in the vapor phase at a temperature of 50 to 350° C. and a pressure of from 1 to 80 atmospheres ethylene, a molecular oxygen-containing gas and steam over a supported catalyst consisting essentially of metallic palladium together with a material selected from the group consisting of oxides and salts of iron, nickel, cerium, copper, chromium, manganese and cobalt.

8. A process as claimed in claim 7, wherein said material is an oxide or salt of chromium.

9. A process as claimed in claim 8, wherein the catalyst consists essentially of a metallic palladium and chromium acetate on a catalyst support.

10. The process as claimed in claim 9, wherein the support is alumina.

References Cited

UNITED STATES PATENTS

| | | | |
|---|---|---|---|
| 3,240,805 | 3/1966 | Naglievi | 260—533 |
| 3,122,586 | 2/1964 | Berndt et al. | 260—533 |
| 3,154,586 | 10/1964 | Bander et al. | 260—533 |

OTHER REFERENCES

Newsome: Technical Paper No. 10, 1960, ALCOA.

LORRAINE A. WEINBERGER, Primary Examiner

R. D. KELLY, Assistant Examiner

U.S. Cl. X.R.

252—465, 472; 260—497, 604